Feb. 13, 1962 W. R. AYTON ET AL 3,020,636
METHOD AND APPARATUS FOR SLITTING TUBES
Filed Oct. 3, 1957 2 Sheets-Sheet 1
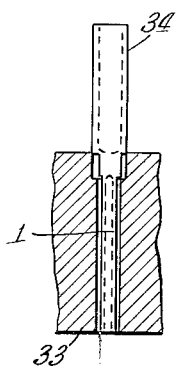
FIG. IA
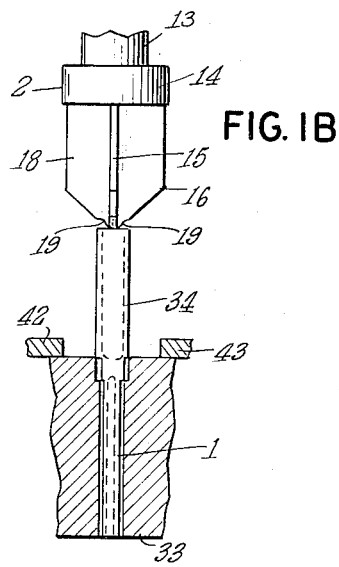
FIG. IB
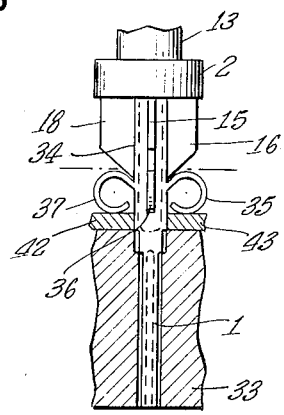
FIG. IC
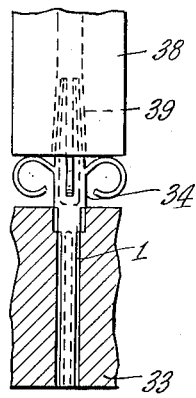
FIG. ID
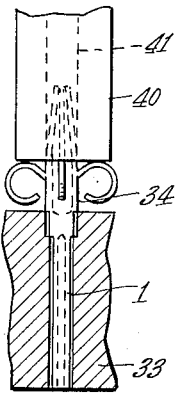
FIG. IE
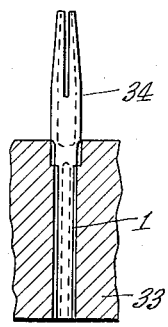
FIG. IF
William Richard Ayton
William Henry Ginnings
Ronald Percy Hocking
INVENTORS
BY
Brumbaugh, Free, Graves & Donohue
ATTORNEYS Feb. 13, 1962   W. R. AYTON ET AL   3,020,636
METHOD AND APPARATUS FOR SLITTING TUBES
Filed Oct. 3, 1957   2 Sheets-Sheet 2

William Richard Ayton
William Henry Ginnings
Ronald Percy Hocking
INVENTORS

BY
Brumbaugh, Free, Graves & Donohue
ATTORNEYS 3,020,636
METHOD AND APPARATUS FOR SLITTING TUBES
William Richard Ayton, London, William Henry Ginnings, Waltham Abbey, and Ronald Percy Hocking, London, England, assignors to Belling & Lee, Ltd., Enfield, Middlesex, England
Filed Oct. 3, 1957, Ser. No. 687,987
Claims priority, application Great Britain Oct. 5, 1956
11 Claims. (Cl. 29—533)

This invention relates to the slitting of tubes and particularly to the production of slits extending from one end of a tube such as for example are required for use as sockets in electrical components.

Tubes with one or more slits extending from one end thereof are frequently desired in industry, particularly when it is desired to impart a certain degree of resilience to a tube. For example in the electronic component industry tubes of small dimensions for example even tubes as small as $\frac{1}{8}$ inch long and $\frac{3}{32}$ inch external diameter, having such slits frequently find applications as sockets for accommodating pins of electrical plugs and similar connectors. One such electrical component having sockets of this character is described in British patent specification No. 649,739. Hitherto the slits have been formed in such sockets by means of a saw. Sometimes the saw is a circular saw operating as one fitment of an automatic machine which forms the sockets as well as slitting them but more frequently sawing is performed as a separate operation subsequent to forming the sockets. Owing to the small dimensions of the tubes encountered in electrical component industry such a saw must of necessity make longitudinal cuts through opposed walls of the tubes, for example in the case of a tube with circular cross section slits are usually diametrically opposed. This means that in the case of tubes of small dimensions the number of slits that can be provided must nearly always be a multiple of two. Sometimes however 3 slits may be required to give a desired resilience. With the saw cutting method only two or four slits can be obtained. This is because a single saw blade cannot make more than two slits simultaneously. However in the particular case of tubes used for sockets of small dimensions such as for example those used in the case of a connector described in British patent specification No. 649,739 only one saw blade can be brought to bear on the tube at any one instant. Therefore in this case the maximum number of slits obtainable in one operation of the saw is only two. In fact it is difficult to obtain more than two slits when saw cutting is carried out at high speed on small tubes since if more than one pair of cuts is attempted by the saw the material of the tube tends to collapse. If further slits are required these usually have to be made by a rotating abrasive wheel operated at high speed. However in high speed production of small slit tubes the life of such abrasive wheels used for making further slits tends to be short. Again sawing whether on large or small tubes results in burrs on at least one interior wall of the tube. Such interior burrs are unsatisfactory since they are more difficult to remove than exterior burrs. Also in the case of an electrical socket if they are not removed they tend to interfere with the electrical contact between the tube and any pin inserted into it when the tube is used as a socket in an electronic component. Such an interior burr therefore tends to make it difficult to obtain a consistent low contact resistance between a socket and any pin inserted into it.

It is an object of the present invention to provide a method of producing slits extending from one end of a tube which method avoids at least some of the above mentioned disadvantages of saw cutting particularly when applied to tubes of small dimensions used as sockets in electronic components.

According to the present invention there is provided a method of producing a slit extending from one end of a tube, which method includes the step of applying a force to the tube wall at the said end in a direction parallel to the longitudinal axis of the tube so as to shear and bend outwardly of the tube a strip of material from a side wall of the tube.

More than one such slit may be formed simultaneously if desired by applying a plurality of such forces simultaneously to the different parts of the end wall of the tube from which it is desired that the slits should start.

When applying force the parts of the side tube wall not directly acted upon by the force should be contained against deformation, for example by a restraining surface in contact therewith. The parts of the tube wall directly acted upon by the force should however not be contained in any manner so as to allow the strip of material sheared by the force to bend outwardly. Hence when a plurality of restraining surfaces are provided in contact with those parts of the tube not acted upon directly by the force, spaces should exist between these restraining surfaces into which spaces the sheared strips of material can bend outwardly from the tube wall.

Thus according to another aspect of the present invention there is provided apparatus for carrying out the above described, method which apparatus consists of at least one restraining surface arranged to conform to and contact at least a part of the exterior side walls of a tube in which a slit is to be formed, a space alongside such surface and arranged to extend parallel to the longitudinal axis of the tube and means for applying a force to the tube wall at the end from which the slit is to extend in a direction parallel to said longitudinal axis so as to shear a strip of material from a part of the side wall not contacted by a restraining surface in such a manner that the strip of material from this part of the side wall bends over into the space.

The apparatus has preferably a plurality of such restraining surfaces with a space in between each pair of adjacent surfaces.

The force is applied to the end of the tube preferably by a blade movable in the space with its plane parallel to the longitudinal axis of the tube. One edge of the blade initially bears on the appropriate part of the end of the tube and then penetrates into the wall of the tube, this edge of the blade being so shaped as to cause the strip of material which it shears from the tube to bend outwardly from such wall. When more than one slit is to be formed an appropriate number of blades each movable in its own space may be provided, the blades being preferably arranged so that the edges which perform the shearing radiate outwardly from a common centre.

In order to cause the sheared strip to bend outwardly of the tube the cutting edge of a blade may slope backwards with respect to the direction of movement of the blade, one extremity of this cutting edge being located on the longitudinal axis of the tube during shearing and the other extremity outside the exterior wall of the tube. The slope of a cutting edge is preferably about 45° to the longitudinal axis of the tube.

The space in which a blade operates is preferably in the form of a slot radiating from the periphery of a hole in a plate. The parts of the periphery of the hole bounding the slot on either side constitute the restraining surfaces mentioned above. The hole is so dimensioned as to accommodate as a push fit the tube and both the hole and slot extend the whole width of the plate. Preferably a slot is such that its width increases progressively in a direction normal to the longitudinal axis of the hole. In one embodiment of the invention capable of producing four diametrically opposed slits in a tube required for use as a socket in a connector such as described in British patent specification No. 649,739, the plate is in the form of a disc divided into four quadrants. Each radial edge of each quadrant is recessed as is the edge through the apex of each quadrant in such a manner as to form the hole and four slots described above when the quadrants are assembled together to form the disc. The assembled quadrants are embraced by a collar closed at one end by a base having a concentric aperture through which a shaft can move. Each quadrant is screwed down to the base of the collar by a suitable screw the head of which is arranged to be flush with the exposed face of the quadrants when the quadrants are in position in the collar. The end of the shaft which moves through the base of the collar carries four blades, preferably held in slots in the end face of the shaft. Each blade is arranged with its faces normal to a face of each of the adjacent two blades. The blades are also arranged to move one in each slot formed by the assembled quadrants. A shoulder on the shaft co-operating with the faces of the quadrants in contact with the base of the collar limits the penetration of the blades into the slots. The traverse of the blades in the opposite direction is restricted by another shoulder on the shaft contacting an internal shoulder in the hole in the base of the collar through which the shaft moves.

In operation the length of the tube which is not to be slit is suitably supported and the length of the tube to be slit is inserted into the hole formed at the centre of the assembled quadrants. Pressure is then applied to the shaft carrying the blades to move them through the slots in the disc formed by the assembled quadrants; that is to say to move them parallel to the longitudinal axis of the tube. As each blade moves through its slot it shears a strip from the wall of the tube. The slope of the cutting edge is such as to force the sheared strip outwardly of the tube and into the slots until when a blade has reached the end of its traverse of a slot, the sheared strip is in the form of a curl projecting outwardly from the exterior wall of this tube but still connected to it. Since four blades with their planes all mutually at right angles to one another act on the tube simultaneously four such curls are formed, all orientated substantially in directions at right angles to one another. The tube has four equally spaced longitudinal slits extending from one end thereof. If desired the number and arrangement of slits can be altered by altering the number and arrangement of blades on the shaft. Alternatively if after removing the projecting curls the tube is rotated about its longitudinal axis through 45° or some other suitable angle in the hole at the centre of the quadrants a further four slits can be produced in the tube making eight slits in all in two operations as opposed to only four slits in two operations in the case of saw cutting and abrasive wheel milling hitherto carried out in the case of tubes intended for sockets in connectors according to British patent specification No. 649,739. However if a different form of blade is used for the second slitting operation a number of slits other than four can be produced in the tube.

The pressure can be applied to the shaft in any desired manner. For example the support and the shearing device may be located under a suitable hand press with the shaft of the shearing device vertical so that the punch of the press bears on the shaft. Preferably the shaft is attached to the punch to bring about its withdrawal from the slot after slitting. For high speed operation however a succession of supports for the tubes may be loaded automatically each with one tube fed to it from a succession of tubes by a hopper. Each support is arranged to embrace the tube automatically with the length of the latter to be slit projecting therefrom. The supports may be moved automatically in succession to a station where a shearing device such as described above is brought into abutment with the face of the support in such a manner that the projecting length of the tube enters the hole in the disc formed by the four quadrants described above. Pressure is then automatically and in synchronisation with the entry of a projecting length of tube into a hole in the four quadrants brought to bear on the shaft, for example by a suitably designed cam, to cause the tube to be slit in the manner already described. The shaft may in this case be spring loaded against the action of pressure so that it retracts from the slots in the disc formed by the quadrants immediately the pressure on it is released.

After slitting the slit length of tube may be tapered by embracing it by a punch having a suitably tapered aperture therethrough. Before or after or simultaneously with tapering the strip of material bent outward of the tube may be detached from the tube in any convenient manner; for example simply by supporting the unslit part of the tube in a suitable support and applying pressure on the junction of the bent strip with the tube wall towards the supported length of the tube; for example by a punch having a hole up which the slit length of tube can pass through. The punch should be such that the end walls of the punch bounding the hole bears on the junction or junctions of the sheared out strip with the tube wall. If slitting is done automatically as is described above the succession of supports carrying the tubes can be moved to a further station after slitting where suitable punches having their action synchronised with the slitting operation taper the slit lengths of tubes in succession and detach in succession the sheared strips from the tubes. Also if desired the tubes can be automatically and suitably rotated in their support after detachment of the sheared strips and subjected automatically to further slitting and detachment operations at further stations to impart further slits to the already slit tubes.

However instead of feeding a succession of tubes each in its own support, which support is moved to a series of stations where the various tools described above act in succession upon each tube, a long length of tube may be advanced successively parallel to its longitudinal axis. The operations of slitting, removal of curls and tapering may be performed at the leading end of this tube by bringing the appropriate tools in succession to act upon this end. Any other operations necessary for forming a socket from the long length of tube may also be carried out before or subsequent to all three or any one of the three before mentioned operations and the formed socket detached from the end of the tube. The tube is then advanced and the operations described above repeated at its leading end and so on.

It will be appreciated that the method of the invention lends itself to the production of an odd number of slits should this be desired as this can simply be achieved by a suitable design of blades in the arrangement described above. This may be of importance in the electrical component industry since the method allows a choice of a number of slits upwards of one thereby increasing control of the contact resistance between a slit socket and its co-operating pin since the contact resistance in turn is governed by the resilience which can be imparted to the socket.

Another important feature of the present invention is that any burrs which are formed are on the outside of the tube in which the slit is made. This is because the strip of material as it is sheared bends outwardly from the exterior wall of the tube. In saw cutting of slits it is inherent in the action of the saw that burrs in the case of one of the slits are made by the saw on the inside of the tube. It is of course easier to remove burrs from the outside of the tube than from the inside. However in the case of slit tubes such as are used for sockets in small electronic components it is sometimes extremely difficult to remove burrs. When the tubes are made according to the present invention the burrs being on the outside of the tube do not affect the electrical contact established between a co-operating pin which is inserted inside the sockets as would a burr on the inside of a socket slit by saw cutting.

Again on slitting, a tube tends naturally to close up and acquire an internal taper. In the absence of internal burrs such a taper, the extent of which is believed to be governed by the length and number of slits in the tube, governs the force with which the tube resists the insertion or extraction of any pin into or from it respectively. Hence it should be possible, because the method of the present invention avoids internal burrs, to correlate this force with the length and number of slits. It is believed that this can be done by obtaining by experiment on any particular type of tube a table giving minimum internal diameters of a tube (which diameters are directly correlated with the force in question) for various lengths and number of slits. Such a table could then be used to settle the subsequent choice of number and/or length of slits for any desired minimum internal diameter for that particular type of tube and hence the force with which the slit tube resists insertion or withdrawal of a pin in to or from it respectively. The fact that the number and/or length of slits in a tube to give a desired resistance to entry and withdrawal of a pin may be predictable means that a separate tapering operation subsequent to slitting as has been described above may become unnecessary.

The invention will now be described with reference to the accompanying diagrammatic drawings in which:

FIGS. 1 a–f illustrate various stages in the formation of slits in the case of one embodiment of the invention applied to tubes for use in the formation of a connector according to British patent specification No. 649,739.

Figure 2:
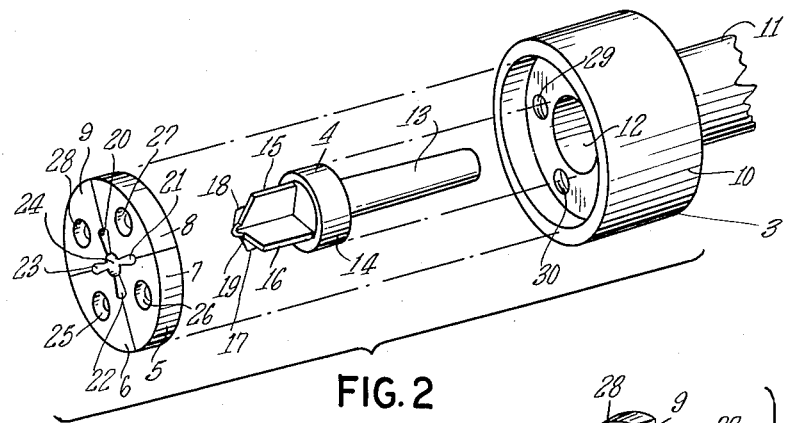
FIG. 2 is an exploded perspective view of a tool for carrying out the method illustrated in FIG. 1.
Figure 3:
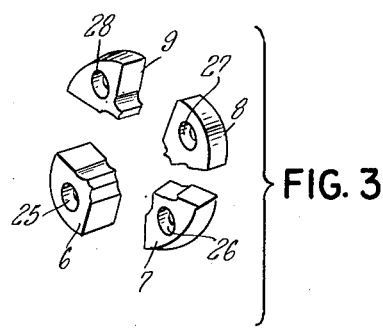
FIG. 3 is an exploded view of a part of the tool shown as assembled in FIG. 2.
Figure 4:
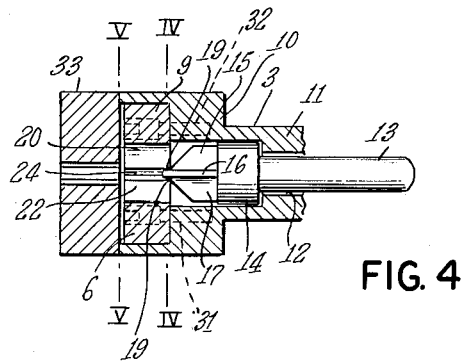
FIG. 4 is a side view in section of the assembled tool of FIG. 2.
Figure 5:
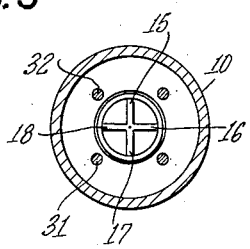
FIG. 5 is a section on the line IV—IV in FIG. 3.
Figure 6:
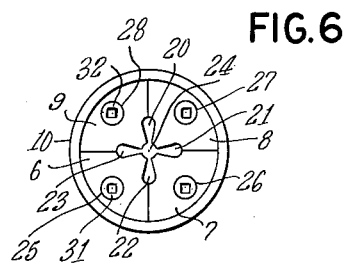
FIG. 6 is a section on the line V—V in FIG. 3.

Referring to FIG. 1, a socket member 1 for use in a connector such as is described in British patent specification 649,739 is held with its longitudinal axis in alignment with the longitudinal axis of a slitting tool 2. In FIG. 1 the connector and tool are shown with their longitudinal axes vertical. These axes may equally well be horizontal and for operation on automatic machinery this is sometimes preferred. The tool 2 is shown in more detail in FIGS. 2 to 6 and is made up of four parts, namely a knife holder 3, a knife 4, a knife-guard plate 5 (FIG. 2) formed from four co-operating segments 6, 7, 8 and 9 (FIG. 3). The knife holder 3 consists of a collar portion 10 having a stem 11 projecting from its closed end. This stem may be formed with means for securring the knife holder to any driven mechanism for working automatically. The stem portion has a channel 12 within which a shaft 13 forming part of the knife can reciprocate. The shaft 13 terminates in a flange 14 into which the knife blades are fitted. These blades, four in all and numbered 15, 16, 17 and 18 in FIGS. 1, 2, 3 and 4, are arranged so that in cross section they form the shape of a cross as is seen from FIG. 4. All four blades converge to a point at the end distant the flange 14. However their convergence is interrupted by a step 19 on each blade which has the effect during the slitting operation of forming a curl which projects away from the sides of the socket member 1 in such a manner as to be readily severed therefrom. The blades 15 to 18 travel through slots 20 to 23 respectively in the knife guide plate 5. These slots radiate from a central bore 24 in the knife guide plate. The walls defining the bore 24 constitutes restraining surfaces conforming to and contacting a part of the exterior side wall of the socket member and the slots in said walls form the spaces in which a sheared strip of material is accommodated. To form the slot and bore four quadrants which make up the knife guide plate are each shaped as in FIG. 3. Each of the quadrants is provided with a screw hole numbered respectively 25, 26, 27 and 28, and this screw hole can accommodate the head of a screw in such a manner that the end face of the screw head is flush with the face of the assembled knife guide plate as in FIGS. 4 and 6. To assemble the shearing tool, the shaft 13 is inserted into the channel 12 in the stem 11 so that the knife blades and flange 14 are within the collar portion 10. The four quadrants 6 to 9 are then assembled about the knife blades so as to form a channel of crosslike cross section with four slots radiating from the central bore as mentioned above. Each of the quadrants is screwed into the base of the collar which is provided with threaded holes, two of which 29, 30 are seen in FIG. 3 and all four in FIG. 5, by screws, two of which numbered 31, 32, are seen in FIG. 4 passing through the holes in the quadrants to the holes in the collar. In operation the tool assembled as described above is located under a punch or automatic mechanism for applying pressure to the shaft 13. The socket member 1 is held in a suitable chuck or holder represented diagrammatically as 33 in FIG. 4 with the part 34 of the socket member 1 to be slit projecting therefrom. The slitting tool 2 is then advanced towards the tube so that the part 34 of the latter enters the bore 24 in the knife guide plate. Pressure is then applied to the shaft 13 to cause the knife blades 15 to 18 to travel through the respective slots 20 to 23. Initially the tool is in the position shown in FIG. 1b. As the knife blades move in their slots they shear off four strips, three of which numbered 35, 36 and 37 are seen in FIGS. 1c to e. The sheared strips form curls projecting from the sides of the socket member 1. Pressure on the shaft 13 is then released and the shaft retracted until the knife blades are clear of the socket member. The chuck or holder 33 (FIG. 4) carrying the socket member 1 is then moved to a position in which the socket member is in alignment with a punch 38 which has a tapering bore 39 therethrough as in FIG. 1d. This punch is caused to move over the slit part 34 to cause the parts bounding the slits to be closed up to form a taper as FIGS. 1d to f. The punch 30 is now retracted and the chuck or holder for the socket member is moved to a position in which the socket member is in alignment with a cutting tool 40 which has a bore 41 therethrough for accommodating the tapered part 34 of the socket member. On pressure being applied, the cutting tool 40 moves over the part 34 of the socket member as in FIG. 1e and cuts off the curled strip to leave a socket member with a tapered portion having four slits as shown in FIG. 1f. This socket member is then removed from the chuck or holder 33 for inspection and further treatment. The operations shown in FIGS. 1a to f may be carried out on an automatic machine. In this case a number of chucks or holders 33 are moved over a circular path and are arranged to stop at various stations around the path. During these stoppages the tool 2, punch 38 and tool 40 act as described above on a socket member held in a chuck or holder stationed opposite the tool. All movements of chucks, tools and punch are synchronised by a suitable control mechanism. In automatic operation, it is preferred to provide the slitting tool with four retractable jaws which grip the part 34 of the socket member just below the end of the slits in FIG. 1c. Two such jaws 42, 43 are shown as retracted in FIG. 1b and as clamping the socket in FIG. 1c. The opening and closing of these jaws are synchronised with the movement of the knife blade towards the retracted and final slitting positions respectively.

We claim:

1. A method of producing a slit extending from one end of a tubular electrical socket element designed to accommodate a plug pin which method comprises the steps of applying a force to the tube wall at said end in a direction parallel to the longitudinal axis of the tube, the parts of the tube wall other than those parts directly acted upon by the force being contained against deformation by a restraining surface formed with a space so located therein as to accommodate the whole of a strip of material sheared and bent outwardly of the tube wall as a result of applying the force, separating the tube and restraining surface and severing the strip of material from the tube.

2. A method of producing a plurality of parallel slits extending from one end of a tubular electrical socket element designed to accommodate a plug pin which method comprises the steps of applying a plurality of forces to the tube wall at said end, the forces all being applied in a direction parallel to the longitudinal axis of the tube, the parts of the tube wall other than those parts directly acted upon by a force being contained against deformation by a restraining surface formed with a plurality of spaces, each space being so located therein as to accommodate the whole of one of a plurality of strips of material sheared and bent outwardly of the tube wall as a result of applying the forces, separating the tube and restraining surface and severing the strips of material from the tube.

3. A method of producing a slot extending from one end of a tubular electrical socket element designed to accommodate a plug pin which method comprises the steps of applying a force to the wall at said end in a direction parallel to the longitudinal axis of the tube, the part of the tube wall other than those parts directly acted upon by the force being contained against deformation by a restraining surface formed with a space, this space being so located and the force being so applied that the whole of a curl projecting outwardly of the tube wall as a result of applying the force is accommodated in the space, separating the tube and restraining surface and severing the strip of material from the tube.

4. A method of producing a slit extending from one end of a tubular electrical socket element designed to accommodate a plug pin which method comprises the steps of applying a force to the tube wall at said end in a direction parallel to the longitudinal axis of the tube, the parts of the tube wall other than those parts directly acted upon by the force being contained against deformation by a restraining surface formed with a space so located therein as to accommodate the whole of a strip of material sheared and bent outwardly of the tube wall as a result of applying the force, inwardly deforming the part of the tube wall containing the resultant slit to impart a taper thereto and thereafter severing the strip of material from the tube.

5. A method of producing a plurality of parallel slits extending from one end of a tubular electrical socket element designed to accommodate a plug pin which method comprises the steps of applying a plurality of forces to the tube wall at said end, the forces all being applied in a direction parallel to the longitudinal axis of the tube, the parts of the tube wall other than those parts directly acted upon by a force being contained against deformation by a restraining surface formed with a plurality of spaces, each space being so located and each force being so applied that the whole of each of a plurality of curls projecting outwardly of the tube wall as a result of applying the forces is accommodated in a space, separating the tube and restraining surface and severing the curls from the tube.

6. Apparatus for producing a slit extending from one end of a tubular electrical socket designed to accommodate a plug pin which apparatus comprises at least one restraining surface arranged to conform to and contact at least a part of the exterior side wall of the tubular socket in which a slit is to be formed, the restraining surface having a slot arranged to extend parallel to the longitudinal axis of the tube and means for applying a force to a part of the side wall of the tube opposite said slot and at the end from which a slit is to extend in a direction parallel to said longitudinal axis so as to shear a strip of material parallel to said longitudinal axis from said part of the side wall said slot in such a manner that the strip of material from this part of the side wall bends over into and is wholly accommodated in the space.

7. Apparatus for producing a plurality of parallel slits extending from one end of a tubular electrical socket designed to accommodate a plug pin which apparatus comprises a restraining surface, each arranged to conform and contact at least a part of the exterior side wall of the tubular socket, the restraining surface having a plurality of slots, each slot being arranged to extend parallel to the longitudinal axis of the tube and means for applying a force to each part of the side wall of the tube opposite a slot and at the end from which the slits are to extend so as to shear a plurality of strips of materials, all parallel to said longitudinal axis, from said parts of the side wall in such a manner that each strip of material from each part of the side walls bends over into and is wholly accommodated in the slot opposite it.

8. Apparatus for producing a slit extending from one end of a tubular electrical socket designed to accommodate a plug pin which apparatus comprises a restraining surface arranged to conform to and contact at least a part of the exterior side wall of the tubular socket, the restraining surface having a slot arranged to extend parallel to the longitudinal axis of the tube and a blade movable in the slot with its plane parallel to the longitudinal axis of the tube, means for moving the blade in the slot so as to apply a force to the tube wall at the end from which a slit is to extend, in a direction parallel to said longitudinal axis and thereby shear a strip of material from a part of the side wall opposite the slot, the blade being shaped so as to cooperate with the means for moving it to cause the sheared strip of material to bend over into and be wholly accommodated in the slot.

9. Apparatus for producing a slit extending from one end of a tubular electrical socket designed to accommodate a plug pin which apparatus comprises a restraining surface arranged to conform to and contact at least a part of the exterior side wall of a tube in which a slit is to be formed, the restraining surface having a slot arranged to extend parallel to the longitudinal axis of the tube and a blade movable in the slot with its plane parallel to the longitudinal axis of the tube, and means for moving the blade in the slot to apply a force to the tube wall at the end from which a slit is to extend, in a direction parallel to said longitudinal axis so as to shear a strip of material from a part of the side wall opposite the slot, the cutting edge of the blade being such that it slopes backwards with respect to the direction of movement of the blade, the blade being so arranged that one extremity of this cutting edge is located on the longitudinal axis of the tube during shearing and the other extremity is outside the exterior wall of the tube, this cutting edge being capable of cooperating with the means for moving the blade to cause the strip of the material sheared from the side wall to bend over into the slot, and be wholly accommodated therein.

10. Apparatus for producing a slit extending from one end of a tubular electrical socket which apparatus comprises a plate having a hole therein, so dimensioned as to accommodate as a push fit at least a part of the tubular socket and a slot radiating from the periphery of the hole, the peripherical walls of the hole constituting a restraining surface arranged to conform to and contact at least a part of the exterior side wall of the tube, both the hole and slot being such as to extend the whole width of the plate and a blade movable in the slot with its plane parallel to the longitudinal axis of the tube, and means for moving the blade in the slot to apply a force to the tube wall at the end from which a slit is to extend, in a direction parallel to said longitudinal axis so as to shear a strip of material from a part of the side wall opposite the slot, the blade being shaped so as to cooperate with the means for moving the blade to cause the strip of material from this part of the side wall to bend over into the slot and be wholly accommodated therein.

11. Apparatus for producing a plurality of parallel slits extending from one end of a tubular electrical socket designed to accommodate a plug pin, which apparatus includes four quadrants capable of being assembled together to form a disc, each radial edge of each quadrant and each edge through the apex of each quadrant being recessed to form a hole with four slots radiating therefrom when the quadrants are assembled to form a disc so the parts of the peripherical wall of the hole constitute a restraining surface, the hole being so dimensioned as to accommodate the tubular socket as a push fit and both the hole and slot extending the whole width of the plate, a collar closed at one end and embracing the assembled quadrants, an aperture in the closed end of the collar, a shaft movable through the aperture, four blades secured to one end of the shaft, each blade being arranged with its face normal to a face of each of the adjacent two blades, which blades are arranged to move one in each of the slots formed by the assembled quadrants, so as to shear four strips of material from a part of the side wall of the tube not contacted by a restraining surface, the blades being so formed as to cause each strip of material so sheared to bend over into the slot in the form of a curl, and the slots being so arranged that each one can accommodate wholly a bent-over strip.

References Cited in the file of this patent
UNITED STATES PATENTS

| | | |
|---|---|---|
| 755,789 | Norton | Mar. 29, 1904 |
| 1,433,890 | Johnson et al. | Oct. 31, 1922 |
| 2,006,283 | Staempfli | June 25, 1935 |
| 2,057,669 | Brauchler | Oct. 20, 1936 |
| 2,464,405 | Knauf | Mar. 15, 1949 |